US012007964B2

United States Patent
Panikkar et al.

(10) Patent No.: US 12,007,964 B2
(45) Date of Patent: Jun. 11, 2024

(54) MAINTAINING ONGOING TRANSACTION INFORMATION OF A DATABASE SYSTEM IN AN EXTERNAL DATA STORE FOR PROCESSING UNSAVED TRANSACTIONS IN RESPONSE TO DESIGNATED EVENTS

(71) Applicant: Dell Products L.P., Round Rock, TX (US)

(72) Inventors: Shibi Panikkar, Bangalore (IN); Pratheek Veluswamy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 262 days.

(21) Appl. No.: 17/462,231

(22) Filed: Aug. 31, 2021

(65) Prior Publication Data
US 2023/0065833 A1 Mar. 2, 2023

(51) Int. Cl.
*G06F 16/215* (2019.01)
*G06F 16/23* (2019.01)

(52) U.S. Cl.
CPC ........ *G06F 16/215* (2019.01); *G06F 16/2358* (2019.01); *G06F 16/2365* (2019.01)

(58) Field of Classification Search
None
See application file for complete search history.

(56) References Cited

U.S. PATENT DOCUMENTS

| 2002/0095403 | A1* | 7/2002 | Chandrasekaran | G06F 12/0815 711/E12.04 |
| 2005/0256897 | A1* | 11/2005 | Sinha | G06F 16/2358 707/999.102 |
| 2016/0350353 | A1* | 12/2016 | Li | G06F 16/2358 |
| 2019/0065542 | A1* | 2/2019 | Baker | G06F 16/273 |
| 2022/0284035 | A1* | 9/2022 | Butterstein | G06F 11/1471 |

OTHER PUBLICATIONS

Oracle, "ORA_ROWSCN Pseudocolumn," https://docs.oracle.com/cd/B19306_01/server.102/b14200/pseudocolumns007.htm, Accessed Aug. 30, 2021, 1 page.
Oracle, "What is Undo?" https://docs.oracle.com/cd/E18283_01/server.112/e17120/undo001.htm#:~:text=Oracle%20Database%20creates%20and%20manages,collectively%20referred%20to%20as%20undo, Accessed Aug. 30, 2021, 1 page.
(Continued)

*Primary Examiner* — Scott A. Waldron
(74) *Attorney, Agent, or Firm* — Ryan, Mason & Lewis, LLP

(57) ABSTRACT

An apparatus comprises a processing device configured to monitor logs of a database system, to analyze the logs to collect ongoing transaction information for one or more applications utilizing the database system, and to maintain the ongoing transaction information for each of the one or more applications in a corresponding one of a set of one or more queues of a data store external to the database system. The processing device is also configured to detect one or more designated events affecting operation of the database system and, responsive to detecting at least one of the one or more designated events, to process one or more unsaved transactions of the database system utilizing the information stored in the set of one or more queues of the data store external to the database system.

20 Claims, 18 Drawing Sheets

(56) References Cited

OTHER PUBLICATIONS

A. Sharma, "Oracle System Change Number: An Introduction," https://www.red-gate.com/simple-talk/databases/oracle-databases/oracle-system-change-number-an-introduction/, May 23, 2016, 9 pages.

Oracle, "What is the Redo Log?" https://docs.oracle.com/cd/E18283_01/server.112/e17120/onlineredo001.htm, Accessed Aug. 30, 2021, 2 pages.

sql.org, "Write-Ahead Logging (WAL)" https://www.sql.org/sql-database/postgresql/manual/wal.html, Accessed Aug. 30, 2021, 2 pages.

* cited by examiner

```
500:
SQL> insert into table_a values (1);
SQL> insert into table_a values (2);
SQL> commit;

Commit complete.

SQL> insert into table_a values (99);  → Don't commit
1 row created.
```

```
505:
select item, ora_rowscn from table_a;

ITEM    ORA_ROWSCN
----    ----------
  1      28143579
  2      28143579
 99

SQL> select current_scn from v$database;

CURRENT_SCN
-----------
 3643295271

SQL> select * from table_a minus select * from table_a
     as of scn 3643295271 or ora_scn 2814359;

ITEM
----
 99
```

510: | App Name | Operation | Pre-Commit Data | Post-Commit Data | SCN | ...... (Statement of Records)

FIG. 5

| NUMBER COLUMN 805 | |
|---|---|
| DERIVED PATTERN | DATA COLLECTION TRIGGERING CRITERIA |
| A SPECIFIC SEQUENCE | OUT OF SEQUENCE |
| LENGTH RANGE | OUTSIDE OF RANGE |

| DATE COLUMN 810 | |
|---|---|
| DERIVED PATTERN | DATA COLLECTION TRIGGERING CRITERIA |
| BEFORE SYSDATE | AFTER SYSDATE |
| AFTER SYSDATE | BEFORE SYSDATE |
| SPECIFIC RANGE | OUT OF RANGE |
| FORMAT | OUT OF FORMAT |

FIG. 8B

| SOURCE/USER COLUMN | |
|---|---|
| DERIVED PATTERN | DATA COLLECTION TRIGGERING CRITERIA |
| LIST OF USERS | NEW USER |
| TIME RANGE THAT USER UPDATES | OUT OF THE TIME RANGE |
| LIST OF DATA UPDATES BY SPECIFIC USER | USER UPDATES DIFFERENT DATA |
| DELETE ONLY SPECIFIC TIME | OUT OF TIME RANGE DELETE |
| NEVER DELETED A SPECIFIC TRANSACTION | DELETING SPECIFIC TRANSACTION |

| GENERIC COLUMN ||
|---|---|
| DERIVED PATTERN | DATA COLLECTION TRIGGERING CRITERIA |
| TIME RANGE FOR BULK INSERTS OR UPDATES | OUT OF TIME RANGE |
| NO UPDATES SO FAR FOR A COLUMN | UPDATE COMES FOR THAT COLUMN |
| BLOB CONTAINS ONLY IMAGES | DATA WITH TEXT |
| FORMAT | OUT OF FORMAT |
| DELETE TIME RANGE | OUT OF TIME RANGE |

MAINTAINING ONGOING TRANSACTION INFORMATION OF A DATABASE SYSTEM IN AN EXTERNAL DATA STORE FOR PROCESSING UNSAVED TRANSACTIONS IN RESPONSE TO DESIGNATED EVENTS

FIELD

The field relates generally to information processing, and more particularly to storage in information processing systems.

BACKGROUND

Database systems may utilize various different types of database technology, including distributed database technology where data is physically stored in multiple different nodes or clusters, where such different nodes and clusters may be located in one or multiple different data centers or geographic locations. Clients can read and write data to the any node or cluster that is part of the database system. It is desirable for database systems to provide consistency, availability and partition tolerance. Consistency is a property which ensures that each client sees the same data at the same time, regardless of which node that client is connected to. Availability is a property which ensures that a client making a request gets a response, even if some nodes of the database system are down or unavailable. Partition tolerance is a property that ensures that the database system continues to work regardless of temporary delays or lost connections between the nodes of the database system.

SUMMARY

Illustrative embodiments of the present invention provide techniques for maintaining ongoing transaction information of a database system in an external data store for processing unsaved transactions in response to designated events.

In one embodiment, an apparatus comprises at least one processing device comprising a processor coupled to a memory. The at least one processing device is configured to perform the steps of monitoring logs of a database system, analyzing the logs to collect ongoing transaction information for one or more applications utilizing the database system, and maintaining the ongoing transaction information for each of the one or more applications in a corresponding one of a set of one or more queues of a data store external to the database system. The at least one processing device is also configured to detect one or more designated events affecting operation of the database system and, responsive to detecting at least one of the one or more designated events, processing one or more unsaved transactions of the database system utilizing the information stored in the set of one or more queues of the data store external to the database system.

These and other illustrative embodiments include, without limitation, methods, apparatus, networks, systems and processor-readable storage media.

BRIEF DESCRIPTION OF THE DRAWINGS

FIG. 5 shows examples of database operations including unsaved transaction data in an illustrative embodiment.

FIGS. 8A-8D shows examples of derived patterns and data collection triggering criteria for different database columns in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
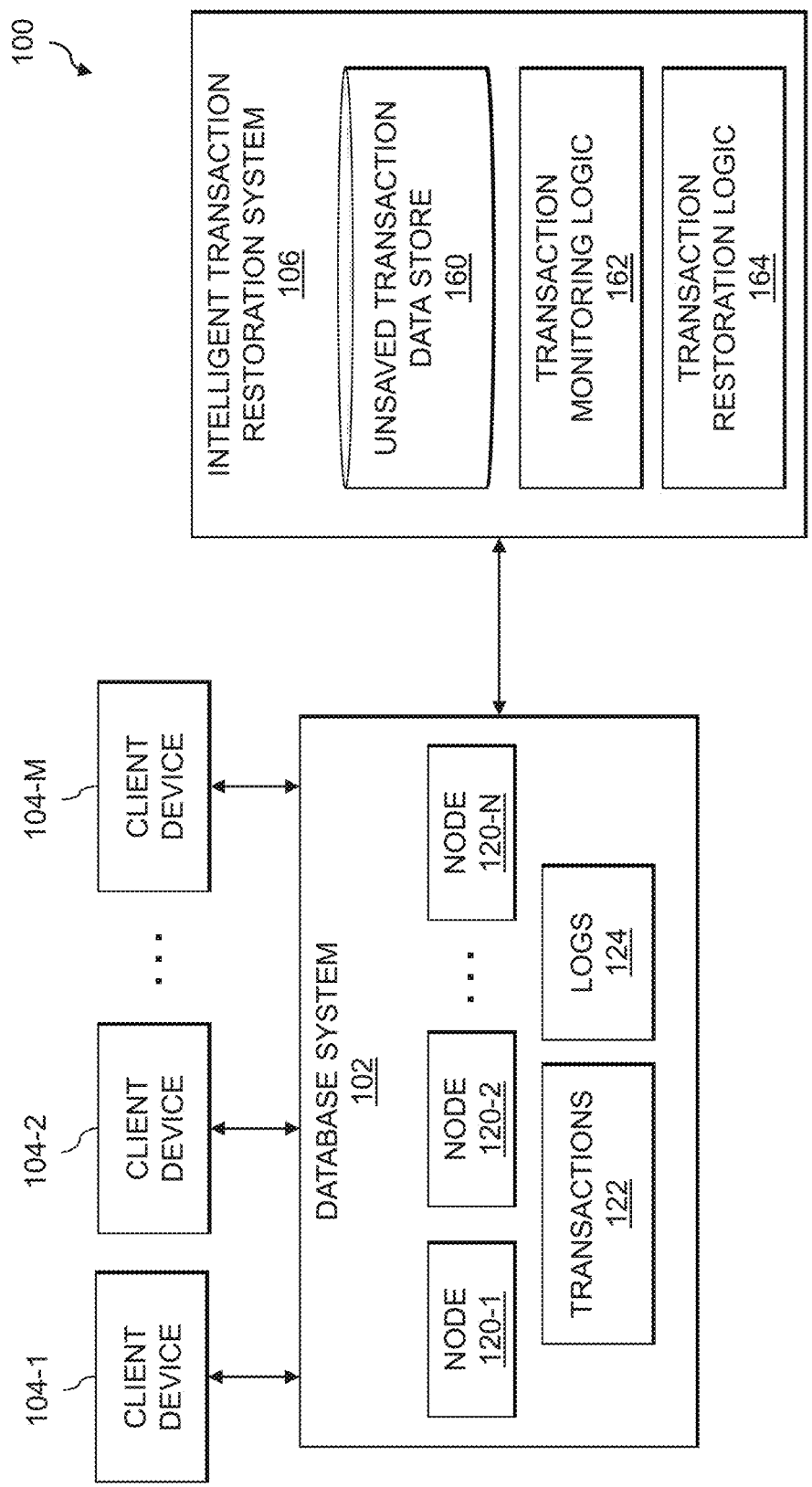
FIG. 1 is a block diagram of an information processing system for maintaining ongoing transaction information of a database system in an external data store for processing unsaved transactions in response to designated events in an illustrative embodiment of the invention.

FIG. 1 shows an information processing system 100 configured in accordance with an illustrative embodiment. The information processing system 100 is assumed to be built on at least one processing platform and is configured to provide functionality for maintaining ongoing transaction information of a database system 102 in an external data store for processing unsaved transactions in response to designated events. The information processing system 100 includes the database system 102 that is used by a plurality of client devices 104-1, 104-2, . . . 104-M (collectively, client devices 104). The database system 102 may comprise a distributed data store including a plurality of nodes 120-1, 120-2, . . . 120-N(collectively, nodes 120). The client devices 104 submit read and write requests to the database system 102, which are associated with transactions 122 stored across the nodes 120. The database system 102 further includes or stores various logs 124 associated with processing of the transactions 122. The system 100 further includes an intelligent transaction restoration system 106 which is configured to provide functionality for recovering unsaved transaction data to the database system 102 in response to some designated events (e.g., a crash of the database system 102, hardware failure of the database system 102, etc.).

The database system 102, client devices 104 and intelligent transaction restoration system 106 are assumed to be coupled via one or more networks (not explicitly shown in FIG. 1). Such networks are assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

The client devices 104 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtual computing resources, such as virtual machines (VMs), software containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The nodes 120 of the database system 102 may comprise physical and virtual computing resources of an information technology (IT) infrastructure. Physical computing resources may include physical hardware such as servers, storage systems, networking equipment, IoT devices, other types of processing and computing devices, etc. Virtual computing resources may include VMs, software containers, etc. The nodes 120 may be implemented using one or more storage systems or devices. In some embodiments, one or more of the storage systems utilized to implement the nodes 120 of the database system 102 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the database system 102, the client devices 104 and the intelligent transaction restoration system 106, as well as to support communication between the database system 102, the client devices 104, the intelligent transaction restoration system 106 and other related systems and devices not explicitly shown.

The client devices 104, as noted above, are configured to submit read and write (e.g., input-output (IO) operations) to the database system 102. Such read and write operations are part of transactions of the database system 102. In some cases, during processing of the read and write operations, some of the associated transaction data is "unsaved" (e.g., it is not committed or rolled back in the database system 102). Such ongoing or unsaved transactions present problems in the event of crash of failure of the database system 102, in that the database system 102 is unable to recover such unsaved transaction data.

The intelligent transaction restoration system 106 illustratively provides an unsaved transaction data store 160, which stores current and ongoing transaction data for the database system 102 to facilitate recovery of unsaved transaction data. The unsaved transaction data store 160 provides a lightweight image of the ongoing transactions of the database system 102 (e.g., for at least a subset of the client devices 102 or applications running thereon which have registered for use of the functionality of the intelligent transaction restoration system 106). In some embodiments, the unsaved transaction data store 160 is implemented as a flash drive or other storage device that is external to the database system 102. The intelligent transaction restoration system 106 also implements transaction monitoring logic 162, which monitors the transactions 122 of the database system 102 (e.g., for at least a subset of the client devices 102 or applications running thereon which have registered for use of the functionality of the intelligent transaction restoration system 106), and stores the unsaved transaction data in the unsaved transaction data store 160. The transaction restoration logic 164 is configured to monitor for failure, crash or other designated events affecting the database system 102, and to generate recommendations or plans for recovery of unsaved transaction data in response to such designated events.

In some embodiments, the database system 102 is operated by or otherwise associated with one or more companies, businesses, organizations, enterprises, or other entities. For example, in some embodiments the database system 102 may be operated by a single entity, such as in the case of a private database of a particular company. In other embodiments, the database system 102 may be associated with multiple different entities, such as in the case where the database system 102 is part of a cloud computing platform or other data center where resources are shared amongst multiple different entities.

The term "user" herein is intended to be broadly construed so as to encompass numerous arrangements of human, hardware, software or firmware entities, as well as combinations of such entities.

In the present embodiment, alerts or notifications generated by the intelligent transaction restoration system 106 are provided over a network to the client devices 104, or to a system administrator, information technology (IT) manager, database administrator (DBA) of the database system 102, or other authorized personnel via one or more host agents. Such host agents may be implemented via the client devices 104 or by other computing or processing devices associated with a system administrator, IT manager, DBA, or other authorized personnel. Such devices can illustratively comprise mobile telephones, laptop computers, tablet computers, desktop computers, or other types of computers or processing devices configured for communication over a network with the intelligent transaction restoration system 106. For example, a given host agent may comprise a mobile telephone equipped with a mobile application configured to receive alerts or notifications from the intelligent transaction restoration system 106 and to provide an interface for the host agent to select actions to take in response to the alert or notification. The alerts or notifications, for example, may comprise recommendations or advice as to how to handle unsaved transaction data when recovering from failure of the database system 102.

It should be noted that a "host agent" as this term is generally used herein may comprise an automated entity, such as a software entity running on a processing device. Accordingly, a host agent need not be a human entity.

The intelligent transaction restoration system 106 in the FIG. 1 embodiment is assumed to be implemented using at least one processing device. Each such processing device generally comprises at least one processor and an associated memory, and implements one or more functional modules or logic for controlling certain features of the intelligent transaction restoration system 106, such as the above-described transaction monitoring logic 162 and transaction restoration logic 164. At least portions of such logic may be implemented at least in part in the form of software that is stored in memory and executed by a processor.

It is to be appreciated that the particular arrangement of the database system 102, client devices 104 and intelligent transaction restoration system 106 illustrated in the FIG. 1 embodiment is presented by way of example only, and alternative arrangements can be used in other embodiments. For example, the intelligent transaction restoration system 106 and the database system 102 may be part of the same IT infrastructure, such as a same data center or cloud computing platform. Further, the intelligent transaction restoration system 106 may be implemented at least partially internal to one or more of the client devices 104. As another example, the functionality associated with the transaction monitoring logic 162 and transaction restoration logic 164 may be combined into one logical module, or separated across multiple logical modules with the multiple modules possibly being implemented with multiple distinct processors or processing devices.

It is to be understood that the particular set of elements shown in FIG. 1 for maintaining ongoing transaction information of the database system 102 in an external data store for processing unsaved transactions in response to designated events is presented by way of illustrative example only, and in other embodiments additional or alternative elements may be used. Thus, another embodiment may include additional or alternative systems, devices and other network entities, as well as different arrangements of modules and other components.

The intelligent transaction restoration system 106, and other portions of the system 100 may in some embodiments be part of cloud infrastructure as will be described in further detail below. The cloud infrastructure hosting the intelligent transaction restoration system 106 may also host any combination of the database system 102 and client devices 104.

The intelligent transaction restoration system 106 and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources.

The database system 102, the client devices 104 and the intelligent transaction restoration system 106 or components thereof may be implemented on respective distinct processing platforms, although numerous other arrangements are possible. For example, in some embodiments at least portions of the database system 102, the intelligent transaction restoration system 106, and potentially one or more of the client devices 104 are implemented on the same processing platform. A given client device (e.g., 104-1) can therefore be implemented at least in part within at least one processing platform that implements at least a portion of the database system 102 and/or the intelligent transaction restoration system 106.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the database system 102, the client devices 104 and the intelligent transaction restoration system 106, or portions or components thereof, to reside in different data centers. Numerous other distributed implementations are possible. The intelligent transaction restoration system 106 can also be implemented in a distributed manner across multiple data centers.

Further, there may be multiple instances of the database system 102 and/or the intelligent transaction restoration system 106, although FIG. 1 shows an embodiment with just one instance of each. For example, there may be a separate instance of the intelligent transaction restoration system 106 (or components thereof, such as multiple instances of the unsaved transaction data store 160), for a different subset of the client devices 104 or applications thereof which access the database system 102. There may also be multiple database systems 102. A single instance of the intelligent transaction restoration system 106 may be associated with such multiple database systems 102. Various other combinations are possible, including where some instances of the intelligent transaction restoration system 106 are dedicated for use with a single instance of the database system 102, where other instances of the intelligent transaction restoration system are shared for use with multiple instances of the database system 102, etc.

Additional examples of processing platforms utilized to implement the intelligent transaction restoration system 106 in illustrative embodiments will be described in more detail below in conjunction with FIGS. 12 and 13.

It is to be appreciated that these and other features of illustrative embodiments are presented by way of example only, and should not be construed as limiting in any way.

An exemplary process for maintaining ongoing transaction information of a database system in an external data store for processing unsaved transactions in response to designated events will now be described in more detail with reference to the flow diagram of FIG. 2. It is to be understood that this particular process is only an example, and that additional or alternative processes for maintaining ongoing transaction information of a database system in an external data store for processing unsaved transactions in response to designated events can be carried out in other embodiments.

In this embodiment, the process includes steps 200 through 208. These steps are assumed to be performed by the intelligent transaction restoration system 106 utilizing the unsaved transaction data store 160, the transaction monitoring logic 162 and the transaction restoration logic 164. The process begins with step 200, monitoring logs of a database system (e.g., database system 102). The logs are analyzed in step 202 to collect ongoing transaction information for one or more applications (e.g., applications running on client devices 104) utilizing the database system. The ongoing transaction information is maintained for each of the one or more applications in a corresponding one of a set of one or more queues of a data store (e.g., unsaved transaction data store 160) external to the database system in step 204. In step 206, one or more designated events affecting operation of the database system are detected. Responsive to detecting at least one of the one or more designated events, one or more unsaved transactions of the database system are processed in step 208 utilizing the information stored in the set of one or more queues of the data store external to the database system.

Figure 2:
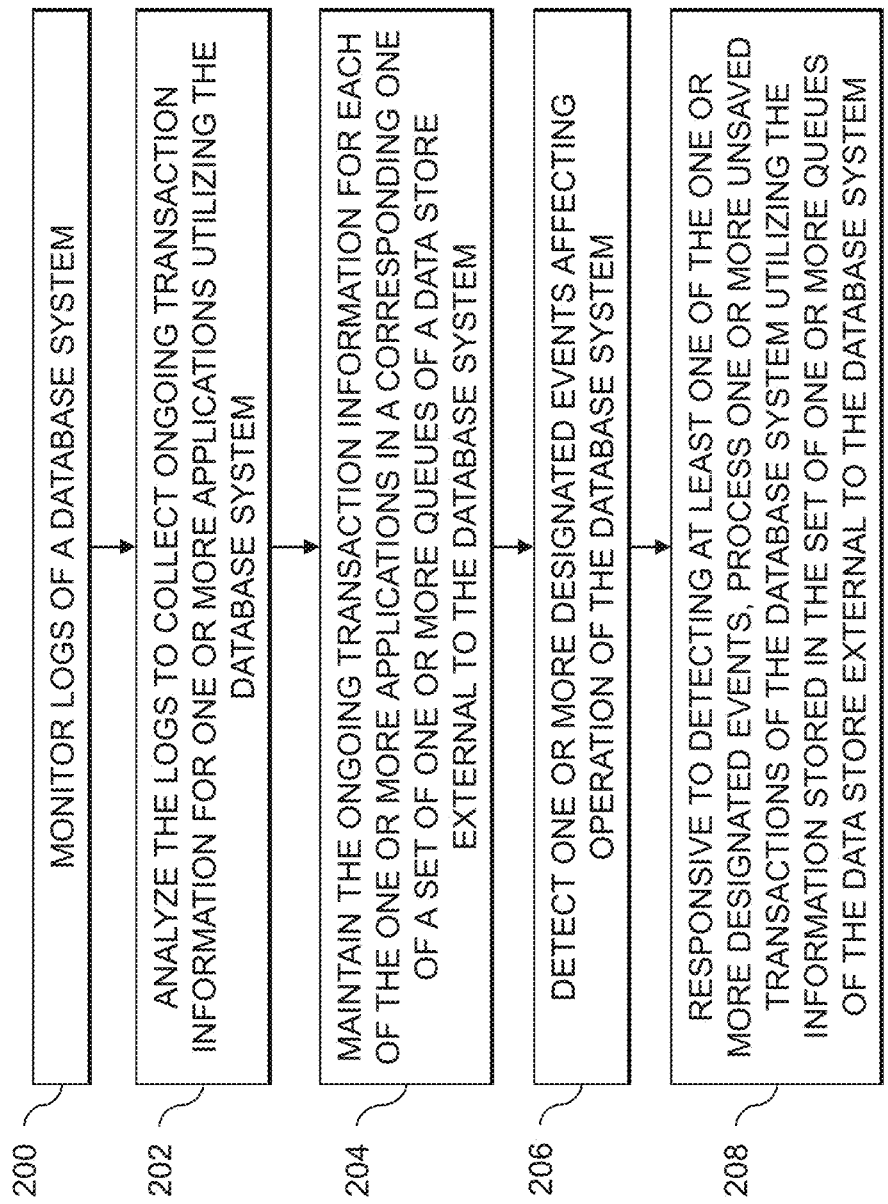
FIG. 2 is a flow diagram of an exemplary process for maintaining ongoing transaction information of a database system in an external data store for processing unsaved transactions in response to designated events in an illustrative embodiment.

The FIG. 2 process may further comprise registering the one or more applications, wherein registering a given one of the one or more applications comprises specifying an application name of the given application, one or more processes of the given application, one or more database objects of the database system to be traced, and one or more transactions for each of the one or more database objects to be traced. Analyzing the logs to collect the ongoing transaction information for the given application in step 202 may comprise streaming, to a given one of the set of one or more queues of the data store external to the database system corresponding to the given application, data associated with the specified one or more transactions.

Step 202 may include, for a given transaction for a given one of the one or more applications, generating a data object for the given transaction specifying an application name of the given application, a given operation, and a current system change number of the database system. The data object may further comprise at least one of pre-commit data and post-commit data for the given transaction. A given one of the set of one or more queues of the data store external to the database system corresponding to the given application may utilize a First In, First Out (FIFO) data structure, and step 204 may comprise maintaining the ongoing transaction information for the given application in the given queue by storing the data object in the FIFO data structure.

Each of the set of one or more queues has an associated queue length comprising a number of transactions, and wherein a given queue length of a given one of the set of one or more queues associated with a given one of the one or more applications is defined during registration of the given application. Data objects for transactions associated with the given application may be stored in the given queue in order based on times of the transactions.

Step 206 may include detecting at least one of a hardware failure, a crash and a disaster event affecting the database system, and step 208 may comprise determining a type of processing to apply for the given unsaved transaction based at least in part on a comparison of the given unsaved transaction to one or more historical processing patterns derived from analysis of historical transactions of the database system. Determining the type of processing to apply for the given unsaved transaction may comprise determining whether to commit the given unsaved transaction to the database system or roll back the given unsaved transaction. The one or more historical processing patterns may be derived by analyzing the historical transactions of the database system utilizing one or more machine learning algorithms. In some embodiments, step 208 includes generating one or more recommendations for a type of processing to apply for the given unsaved transaction, and providing the one or more recommendations to a database administrator of the database system.

Database solutions can change quickly to meet ever-changing needs of different use case scenarios, and to adapt for use with new database technologies. For example, database technology may use orthodox or traditional row store, column store, or hybrid store solutions. Further, usage of data is becoming more and more relevant for designing database solutions. The usage of data is important not only for transactional applications, but also for analytics used in an overall data pipeline which may include multiple data stores. As the importance of data may change and potentially increase day by day, the danger of failure on the database side also presents challenges. Database solutions are continually being developed, including with novel strategies in clustering (e.g., availability), data syncing between clusters, and consistency.

However, in any database (e.g., including various modern database solutions), if the database crashes or a failure or disaster happens in hardware, it is impossible for the database administrator (DBA) to retrieve ongoing transactions. Such ongoing transactions include unsaved current transactions. Unsaved transaction data includes data that is part of transactions that have not been committed or rolled back. Cluster replication will happen only if the data is saved. Thus, even if a load balancer performs failover to another cluster, the "unsaved" current transaction data is lost. In some traditional database systems, important data transactions may be on transactional synchronous calls to the database where an end-user will get an error message and can decide to retry the transaction from the client side, which would go to another cluster and end-user continuity is maintained. Here also, the DBA needs to handle faulty cluster data inconsistencies while bringing back the failed cluster. In some newer database systems, the data pipeline may be used for critical operations like subscription billing (e.g., Apex), where jobs are running to transform the data in one form to another and store the data in another database in the pipeline before it reaches its final form. In accordance with the Consistency, Availability and Partition Tolerance (CAP) theorem for databases, in the event of failure of the database system it is possible to provide either consistency or availability but not both. Thus, in any real-time database technology, only Consistency and Partition Tolerance (CP) or Availability and Partition Tolerance (AP) may be provided and either availability or consistency needs to be compromised. In such systems, if the database crash occurs in a high consistency database (e.g., a CP database exhibiting consistency and partition tolerance characteristics), all the unsaved data is lost. If the database crash occurs in a high availability database (e.g., an AP database exhibiting availability and partition tolerance characteristics), there is no way to understand the latest transactions.

Illustrative embodiments provide solutions which address the issue of losing unsaved data (e.g., ongoing transactions, such as long transactions in data pipeline operations) in the event of database crashes (e.g., hardware failures). During long transaction operations, when the database crashes (e.g., due to hardware failure), conventional approaches have no way to recover the unsaved data (e.g., data that is not committed or rolled back). The only way for conventional approaches to handle this situation is to repopulate the data in the database, by capturing the state of the transactions in the middle tier and re-processing the complete transactions. Conventional approaches, when faced with database disaster (e.g., crashes due to hardware issues), will just fail over to other available data centers and applications need to re-process all ongoing transactions.

In some embodiments, an intelligent data store is designed for storing the data of transactions (e.g., current and ongoing transactions) for a database system. The intelligent data store may be implemented as a lightweight drive providing an image or data store for the transactions. The intelligent data store may be implemented as a flash drive or other type of storage device that is external to the database system. The drive or other storage device may be located in an altogether different data center than the data center or data centers which host the database system. The drive or other storage device may alternatively be implemented in the form of a pluggable external or internal drive configured for connection to the database system. The drive or other storage device may provide a pluggable database (DB), that may be stored inside a container DB, according to fault tolerance requirements. The intelligent data store provides a complement to existing database systems. If the intelligent data store fails, for example, the system is in no worse a place as nothing is lost. If the intelligent data store does not fail, it can be used for getting the transaction data (e.g., for current and ongoing transactions involving the database system).

The intelligent data store is illustratively kept totally outside the database system, meaning that a hardware crash or other failure of the database system should not affect the intelligent data store. The intelligent data store is implemented as part of an intelligent transaction restoration system, with the intelligent data store being based on or utilizing a novel type of First In, First Out (FIFO) data structure. The intelligent transaction restoration system is configured for reverse engineering the normal transaction flow to build the intelligent data store.

Intelligent transaction restoration systems can provide various different functions. Such functions include registering applications that want to participate in or otherwise utilize the intelligent data store for providing data consistency and availability in the event of database crashes for the database system. It should be appreciated that only a subset of the applications which utilize a particular database system may register for use of the intelligent data store. For example, in some embodiments only those applications with mission critical operations may participate in or otherwise utilize the intelligent data store. The intelligent transaction restoration system can register applications using Structured Query Language (SQL) queries and Table Objects.

The intelligent transaction restoration systems may also implement listeners that are configured to monitor or listen to database logs of the database system. Depending on the way in which the database system is implemented, the listener utilized may vary and different adapter models may be utilized. The listener will get various transaction information from relevant data logs, including undo, redo, Write-Ahead Logging (WAL), and commit logs. Transaction information can also be read from block headers. The listener will further replicate the data from such logs to the intelligent data store. The data is stored within the intelligent data store in association with an application number, system change number (SCN), pre-commit and/or post-commit data, etc. Advantageously, the data is stored and arranged in the intelligent data store in such a way that, when needed (e.g., following a database crash), the data can be restored to the database system. The intelligent data store may keep data only for current or recent transactions in a novel FIFO data structure.

If the database system crashes, and at the time the database system is brought back up, the intelligent transaction restoration system will restore current unsaved transaction data from the intelligent data store. The intelligent transaction restoration system may provide an interface that shows an end-user (e.g., a DBA) the current unsaved transaction data by application, database table and possibly other parameters (e.g., user/source, time or time range, etc.). The intelligent transaction restoration system may further provide advice or recommendations as to whether the current unsaved transaction data is to be committed or not based on various factors (e.g., statistical analytics based on historical data transaction patterns, the status of data replication to other clusters of the database system, etc.).

In a general database flow, a commit operation essentially only updates the flag in the transaction table of the undo or rollback segment header to indicate that the transaction has been committed. The actual block, however, is not revisited, meaning that the undo byte address (UBA) in the interested transaction list (ITL) which is located in the header of the data block still points to the transaction table of the corresponding undo or redo segment. The block header holds general information about a block, such as the address of the block on disk, segment type, transaction information, etc.

All changes made to user data or to the database dictionary are recorded in log files (e.g., in an Oracle® database this may include undo, redo, WAL and commit logs). These log files contain all the information necessary to a transaction, committed or not. Once the database system receives commit or rollback confirmation, the information in the log files will be wiped off to keep only the consistent image. Again continuing with the example of an Oracle® database, an ORA_ROWSCN command returns the conservative upper bound system change number (SCN) of the most recent change to the row. From this, it is possible to differentiate inflow data.

Figure 3:
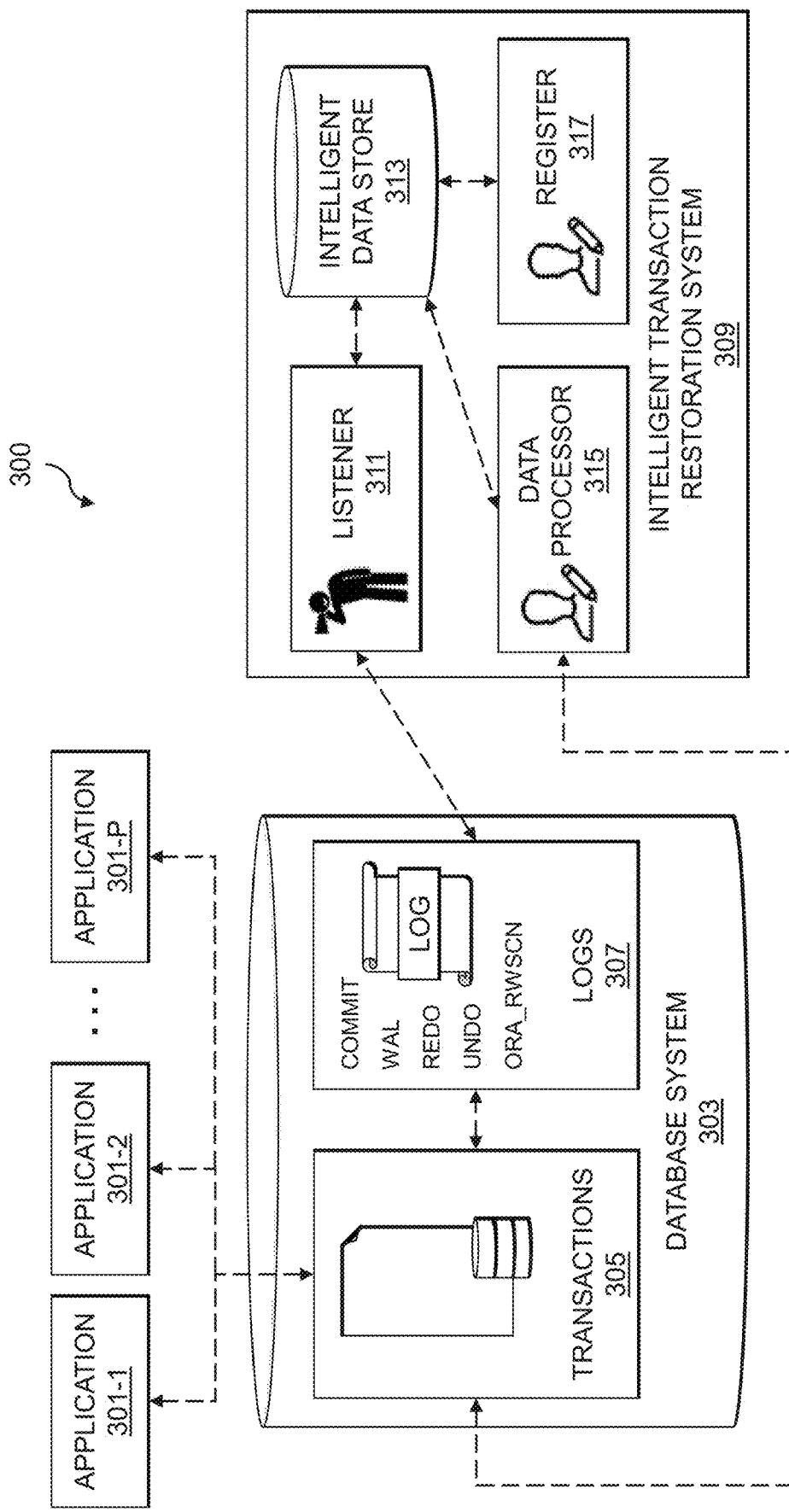
FIG. 3 shows an architecture for intelligent restoration of ongoing transactions in response to designated events affecting a database system in an illustrative embodiment.

FIG. 3 shows an architecture 300 configured for restoring transactions in the event of database failure. The architecture 300 includes a set of applications 301-1, 301-2, . . . 301-P (collectively, applications 301) which submit requests to a database system 303. Such requests form transactions 305 which are stored in the database system 303. The database system 303 further includes a set of logs 307 (e.g., commit, WAL, redo, undo, ORA_ROWSCN logs, etc.). An intelligent transaction restoration system 309 is coupled to the database system 303. The intelligent transaction restoration system 309 implements a listener 311, an intelligent data store 313 (e.g., a flash drive), a data processor 315 and a register 317.

The listener 311 monitors or listens to the different logs 307 in the database system 303 to collect ongoing transaction information of registered applications (e.g., at least a subset of the applications 301 which have registered to utilize the intelligent transaction restoration system 309). The listener 311 also collects the respective tables and queries, and reverse engineers and stores them in the intelligent data store 313. The intelligent data store 313, which may comprise a flash drive, in some embodiments implements a FIFO based data store and stores ongoing transaction data (e.g., as collected from the logs 307 by the listener 311) for the registered applications (e.g., based on the FIFO structure).

The data processor 315 provides various functions, which may be exposed via different application programming interfaces (APIs), for: showing ongoing or current transaction data by application and data object; advising, based on transaction patterns, replay of the transactions; and processing ongoing transactions from the exact point of failure of the database system 303.

The register 317 helps the applications 301 register to participate in the functionality provided by the intelligent transaction restoration system 309 (e.g., to participate in smart lightweight image drive replay of ongoing transactions in the event of failure of the database system 303).

Figure 4:
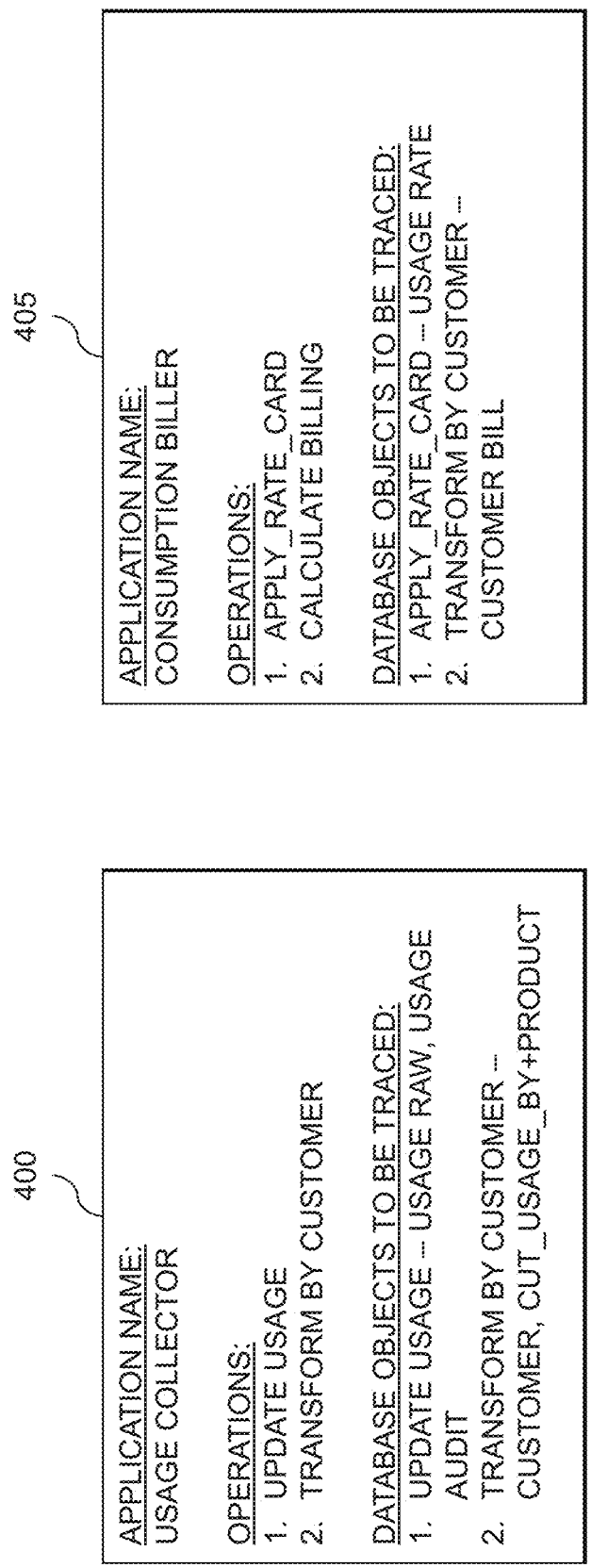
FIG. 4 shows data utilized for registration of applications with an intelligent transaction restoration system in an illustrative embodiment.

Functionality of the register 317 will now be described in further detail. During registration of a given one of the applications 301 (e.g., application 301-1), an end-user will be prompted to provide various information. Such information may include, for example, the application name, operations and database objects to be traced, particular SQL queries of such operations (e.g., if specified only such SQL queries will be traced, otherwise all SQL queries will be traced). Consider, as an example, a subscription pipeline for consumption billing where usage data is collected from customer locations and processed for billing. Assume that there are two applications (e.g., a usage collector and consumption biller) that connect to one database (e.g., database system 303). FIG. 4 shows examples of registration data 400 and 405 for the usage collector and consumption biller applications.

Once the registration is completed, the listener 311 starts to listen for ongoing transactions. The listener 311 looks into performing reverse engineering of normal transaction flow. Assume, for example, that the database system 303 is implemented as an Oracle® database. Consider the set of SQL queries shown in the example 500 of FIG. 5. Following the SQL queries shown, all the statements of records which are unsaved will be logged into redo or undo logs, and the value 99 can be associated with an ORA_SCN value inside the block which has a linking association with the block ITL (Interested Transaction Limits) and the SCN (System Change Number). Next, consider the command shown in the example 505 of FIG. 5. As the transactions are started, the listener 311 (e.g., which may be implemented using an Oracle® Adapter), will start streaming the data to the intelligent data store 313 in the form shown in example 510 of FIG. 5. While FIG. 5 shows examples 500, 505 and 510 associated with an Oracle® database, similar examples may be applied or used with other types of databases and the listener 311 may create different database adapters according to the database implementation.

Taking an Oracle® database as an example, there are two high-level types of backup and recovery—complete and incomplete. These may be further categorized with more detail such as differential, cumulative, etc. With any of these recovery options, however, recovery is only available for consistent data. There is no solution to perform smart recovery of ongoing transactions (e.g., inconsistent data). If the database system 303 abnormally terminates, the database system 303 will be restarted and mounted. The recovery, however, is incomplete (e.g., until some designated time, change or SCN, cancel, etc.). The database system 303 comes to a consistent state, but has no knowledge of ongoing transactions which are not committed and such transactions will be blindly rolled back. The archive log count may be reset to 0 or wiped off. As noted above, currently in real time any database technology can only provide CP or AP for the CAP theorem, which means that either availability or consistency must be compromised.

The intelligent transaction restoration system 309 provides solutions for performing incomplete recovery during crash of the database system 303. The intelligent transaction restoration system 309 utilizes the intelligent data store 313 to construct a lightweight image of the unsaved transaction data continuously. The lightweight image includes a system change number (SCN), rollback and WAL logs, session history, etc. of ongoing transactions which are stored in the intelligent data store 313 (e.g., which may be connected externally relative to the database system 303, and may be embodied as a plug-in/plug-out flash drive with replay capability). The example 500 of FIG. 5 shows an ongoing transaction (e.g., for table_a). If the SQL query "select*from table_a" is run, it will return only the values 1 and 2, not the value 99 as this is an ongoing transaction not yet committed. Because the value 99 is still ongoing, it is not reported in response to the "select*from table_a" SQL query.

After a crash, there is no system of record for the value 99, and thus database recovery will be incomplete. The intelligent transaction restoration system 309, as illustrated in example 505 of FIG. 5, can perform reverse engineering to map the value. The ORA_ROWSCN command is used to return the conservative upper bound SCN of the most recent change to the row. From this, it is possible to differentiate inflow data. All changes made to the user data or to the database dictionary are recorded in the log files. The logic of the intelligent transaction restoration system 309 performs the reverse engineering based on the normal flow of database operations to build the lightweight image along with its statement, and stores it during ongoing activity of the database system 303. Once the information is framed, replay logic is implemented to make intelligent decisions for database recovery of the ongoing transactions.

The intelligent data store 313 illustratively stores the data provided by the listener 311 in a novel way. Here, the requirement is that the data is needed at the time of crash of the database system 303 only. Thus, the data does not need to be stored permanently. The novel data structure implemented by the intelligent data store 313 creates sorted queues and retrieves the data very fast, in the order of insertion (e.g., based on the FIFO structure of the intelligent data store 313). In some embodiments, each registered application will have its own queue in the intelligent data store 313. When a new application is registered, a new queue will be created for that application in the intelligent data store 313. For each queue, the queue depth (e.g., how much data will be stored) is calculated based on a number of operations and a number of columns to be stored (e.g., for 1 to 10 columns→1 KB, for 10 to 20 columns→20 KB, etc.). The Queue Depth of Each Application=Number of Operations*Column Segment*120/100. Each registered application will also specify how much time or how long the data needs to be stored. As noted above, the data stored in the intelligent data store 313 does not need to be kept forever. Once the data is committed or rollbacked from the main database system 303, it is no longer needed in the intelligent data store 313. Thus, when the write is reaching the maximum queue depth, the first data stored will be overwritten by the new data.

Figure 6A:
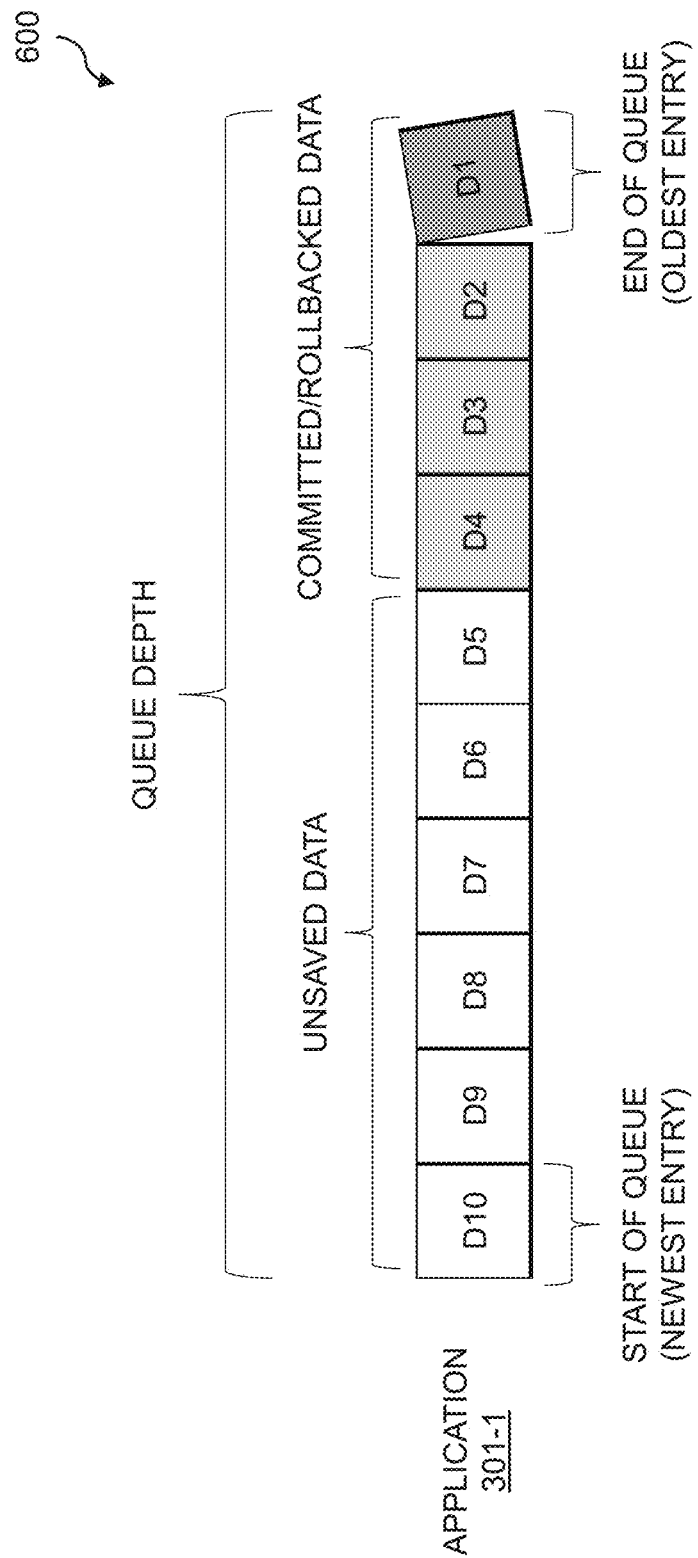
FIGS. 6A-6C show examples of queues in an intelligent data store of an intelligent transaction restoration system in an illustrative embodiment.
Figure 6B:
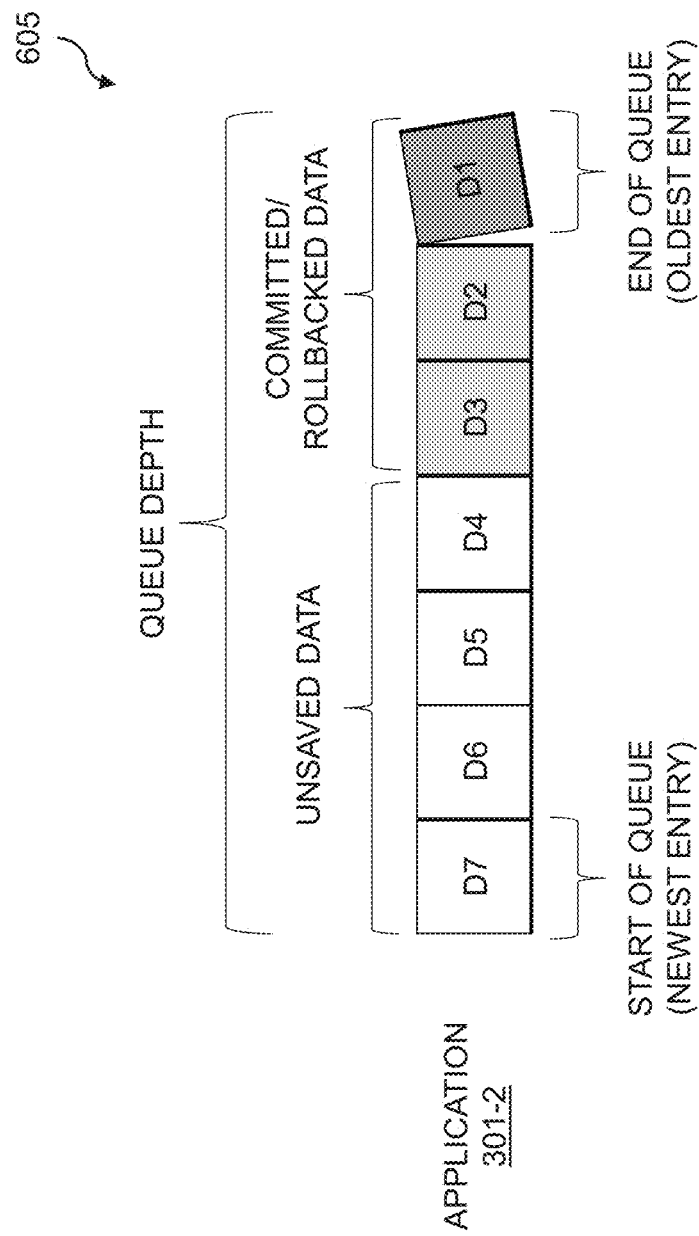
Figure 6C:
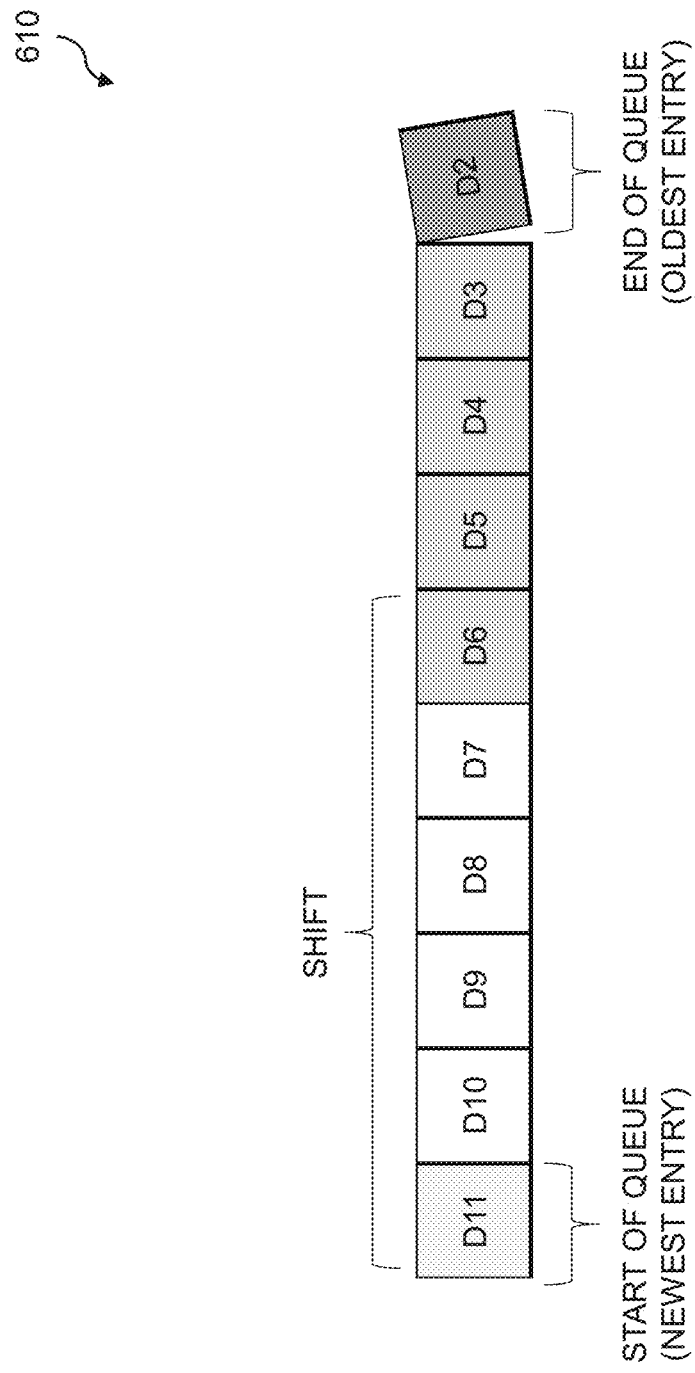

Storage of data in queues in the intelligent data store 313 will now be described in further detail with respect to FIGS. 6A-6C. FIGS. 6A and 6B show examples of queues for two different applications, application 301-1 and 301-2, each of which is assumed to be registered with the intelligent transaction restoration system 309 and loads data into respective queues. As shown in FIG. 6A, the application 301-1 loads SQL data in its queue 600, which has a queue depth of 10. Data D1 is entered first, followed by D2, D3, . . . D10, with D10 being entered last (e.g., most recently). As shown in FIG. 6B, the application 301-2 loads SQL data in its queue 605, which has a queue depth of 7. Data D1 is entered first, followed by D2, D3, . . . D7, with D7 being entered last (e.g., most recently). In FIGS. 6A and 6B, different portions of the data are shown with different shading. White-shaded data represents unsaved data, while medium gray shades indicated committed or rollbacked data, with the darkest gray shade indicating the item at the end of the queue (e.g., the item which will be evicted next when new data is to be added, as illustrated in FIG. 6C). As illustrated by FIGS. 6A and 6B, different registered applications 301-1, 301-2 have their own queues 600, 605 in the intelligent data store 313, and the different queues 600, 605 may have different associated lengths and amounts of data stored therein.

FIG. 6C illustrates an application adding new data to a queue 610, which is shown shaded in light gray. Writes of data will happen in the "left" side of the queue, while reads will happen in the "right" side. When there is a crash or other disruption of the database system 303, it is thus possible to quickly read the unsaved data in order of insertion. FIG. 6C illustrates the application 301-1 adding new data, D11, to its queue, which causes a shift such that the data D1 (previously stored in the last entry of the queue 605) is evicted or removed resulting in the queue 610.

Using the novel queue-based storage of data, each registered application's ongoing transactions are stored in the queue format based on the time, and the data processor 315 can pick up unsaved transactions easily when replay needs to be done for a particular registered application.

The data processor 315 will be used when a disaster event happens affecting the database system 303. For example, the database system 303 may include a cluster of nodes, and the disaster event may be a failure of at least one of the nodes. It should be appreciated, however, that embodiments are not limited solely to use with database systems having multiple nodes. An event may also be a crash that affects a single-node database system. When such an event is detected, the data processor 315 will get the snapshot of all the data (e.g., pre-commit, post-commit, unsaved data, statement of records) for the applications that have registered with the intelligent transaction restoration system 309. The snapshot or data may be organized by application and/or by operation.

In some embodiments, the data processor 315 includes logic for analyzing the behavior of the data by looking at the history of the same or similar operations. Using historical patterns, the data processor 315 can then generate recommendations or advice as to the operations that should be performed for any unsaved data. Historical pattern outcomes may be derived as one of two outcomes: one where different queries in an operation are getting commit or rollback at the end of operation (e.g., a single transaction); and one where different queries are getting committed individually. Machine learning algorithms may be used for deriving the historical pattern outcomes, and for generating recommendations or advice (e.g., to help a DBA to make decisions as to whether to forward or rollback unsaved data following a crash, failure or other designated event). The DBA, or an end-user of a particular registered application, can see the unsaved data (as well as optional recommendations for how to handle the unsaved data), and can opt for replay as desired (e.g., forward or rollback of the unsaved data).

Figure 7:
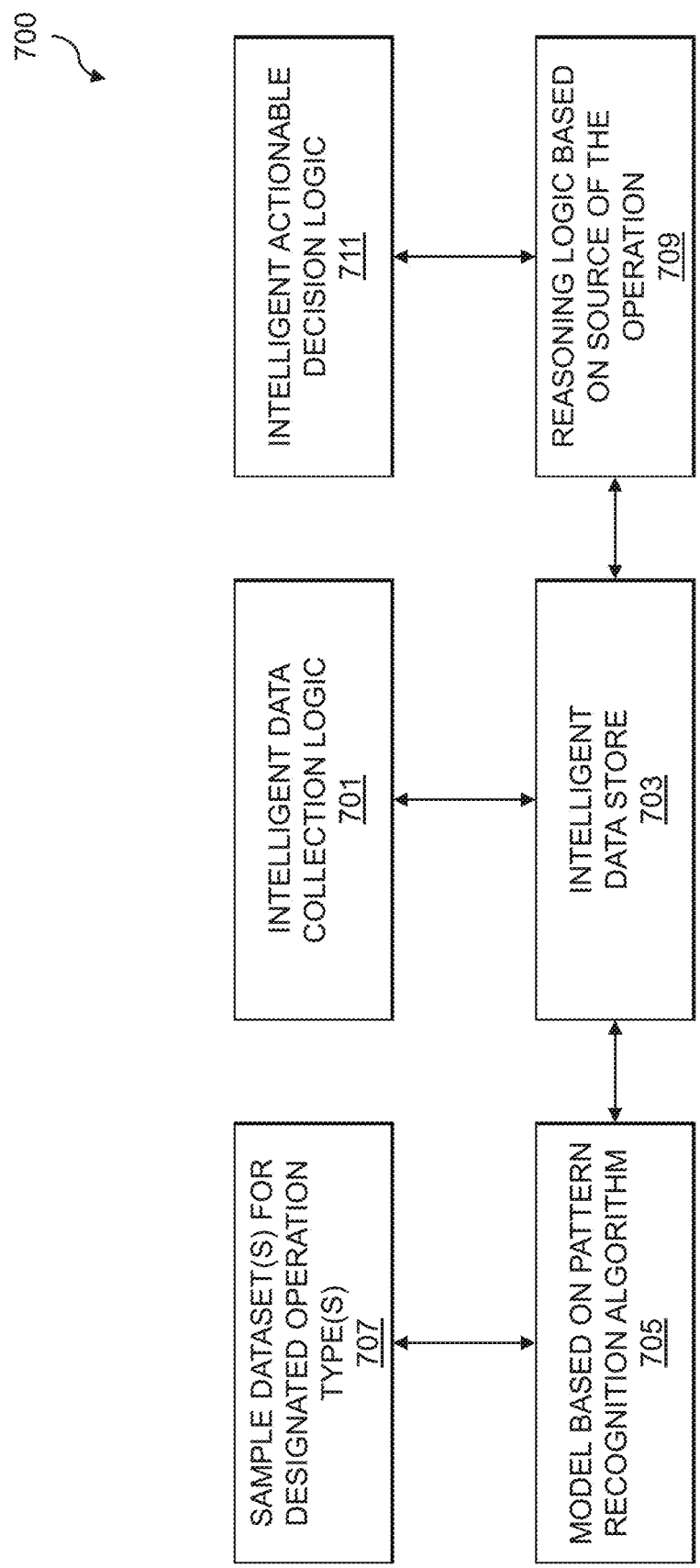
FIG. 7 shows a process flow for data collection and restoration of unsaved transaction data in an illustrative embodiment.
Figure 8A:

FIG. 7 illustrates an overall process flow 700, where intelligent data collection logic 701 collects transaction data and logs from a database system, and stores such information in an intelligent data store 703. The intelligent data store 703 utilizes a model 705 (e.g., which may be a machine learning-based model) generated utilizing pattern recognition algorithms that are trained using one or more sample datasets 707 for one or more designated operation types. Reasoning logic 709 analyzes the transaction data in the intelligent data store 703 and, based on the source of the operation and the model 705, generates recommendations for how to handle unsaved data in response to designated events (e.g., crash or failure of a database system). The intelligent actionable decision logic 711 uses such recommendations for determining how to handle unsaved data when such designated events are detected. In some embodiments, the recommendations are provided to end-users such as a DBA, who then accepts or rejects the recommendations. In other embodiments, the recommendations may be adopted automatically. The choice of whether to automatically implement the recommendations or whether to require end-user input may be based on operation or transaction type, may be specified by different applications when registering, etc.

A sample dataset 707 for a critical application process will now be described. Once an end-user has defined the application process, the system 700 may collect all physical store entities associated with that application process. All data in those entities (e.g., tables in a normal database management system (DBMS) database) is collected, and relationships between the entities are determined. The model 705 is then generated utilizing a pattern recognition algorithm, which may be a machine learning algorithm. Pattern recognition algorithms may be created for each column. Different types of pattern recognition algorithms may be utilized, and the pattern recognition algorithms may take into account various factors or parameters such as: uniqueness; frequency of repetition over a given period of time; number of unique data in a column; nature of the date column (system date, format of the data, etc.); pattern in numbers, if any, in number data types (e.g., sequence, number range, etc.); any organization or entity-specific information (e.g., a product column for a given vendor may include only products of that vendor); whether data is encrypted; maximum and minimum data length; etc.

Once the model 705 understands the behavior of the data in the columns of the table, when new data comes in the model 705 is able to say accurately whether new data falls into the same data behavior of any of the columns of the table. If the new data does not fall into the known data behavior patterns for any of the columns, that new data may be classified as an outlier and any pre-operation and post-operation data may be obtained for use in further training of the model 705. FIGS. 8A-8D show tables 800, 805, 810, 815 and 820 illustrating examples of derived patterns for a string column, number column, date column, source/user column and generic column, respectively. Each of the tables 800, 805, 810, 815 and 820 also illustrate criteria which triggers data collection on new inserts and updates. For example, in the context of the string column table 800 shown in FIG. 8A, one of the derived patterns is a particular string length range.

If a new string is inserted or updated with a length outside of that length range, this triggers data collection.

It should be appreciated that the particular derived patterns and data collection triggering criteria shown in FIGS. 8A-8D are presented by way of example only. In other embodiments, more, fewer or different patterns and associated data collection triggering criteria may be used. Further, the model 705 may be continually updated, such that derived patterns and associated data collection triggering criteria may change over time (e.g., such as where new patterns are derived over time, where existing patterns are modified or deleted, etc.). Various text pattern recognition modes may be utilized, and end-users may add new pattern models. In some cases, pattern models may be specific to particular application processes and data tables.

If the system 700 finds a deviation (e.g., in response to one or more data collection triggering criteria), the data will be stored. If there is no request for recovery for that specific deviation, the model 705 may learn that this deviation is not an issue, and disable, change or otherwise update the pattern recognition accordingly. For example, in the string column table 800 shown in FIG. 8A, the "specific group" derived pattern may include vendor products. When this pattern is first derived, the column may only contain descriptions of a specific product or product model (e.g., Laptop Model A product descriptions). Over time, new descriptions of other products may be encountered (e.g., Laptop Model B product descriptions). Initially, such new descriptions may be marked as deviations and associated data will be collected. If a user does not ask to revert transactions with these new descriptions, however, then the new description (e.g., Laptop Model B) may be added to the list of allowed strings and in the future descriptions for that model will not trigger data collection.

Figure 9:
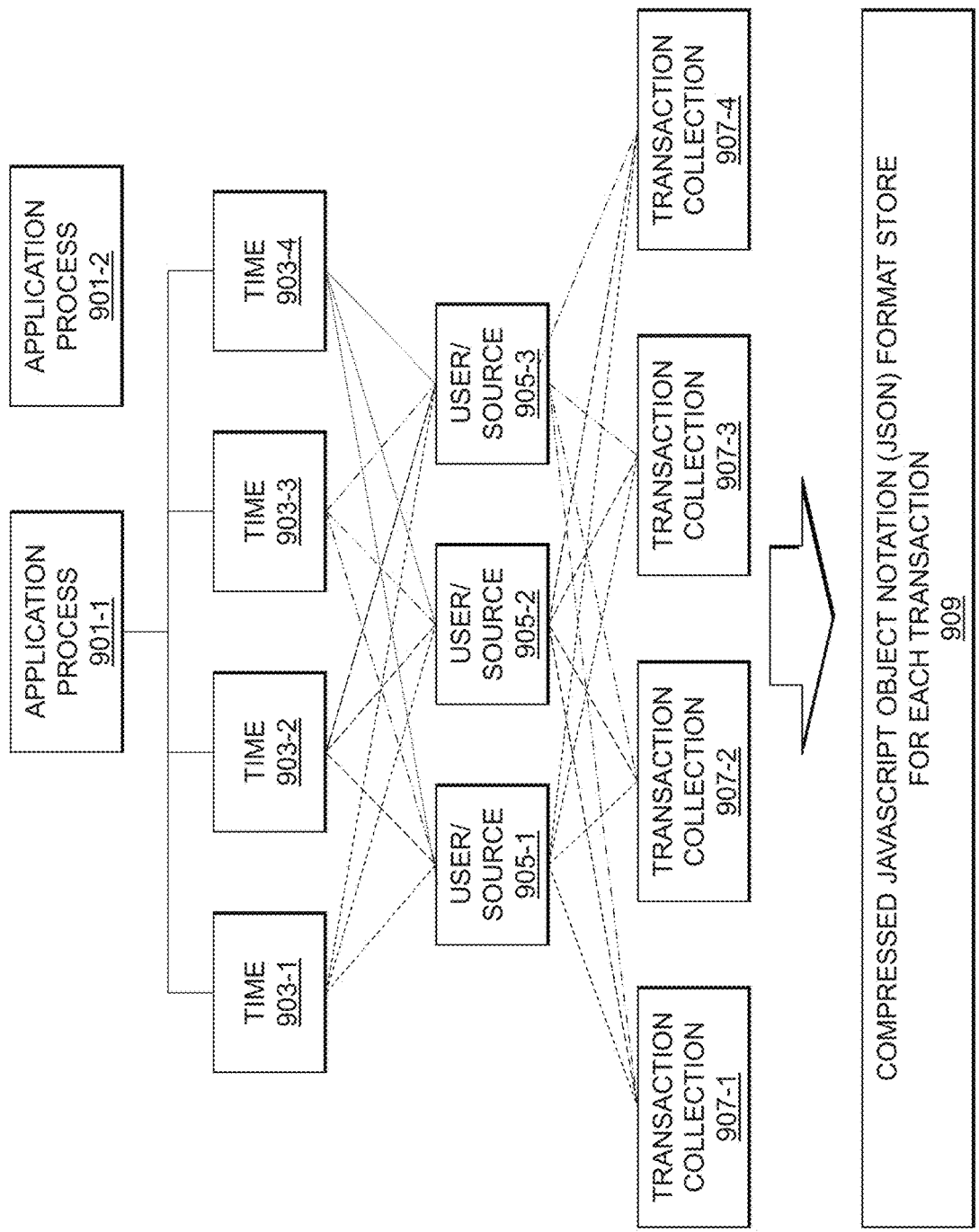
FIG. 9 shows storage of data by application process, time, user or source and transaction collection in an illustrative embodiment.

The intelligent datastore 313 provides an efficient way of storing transaction data such that it can be retrieved on demand. For example, SQL statements and data of application transaction processes should be efficiently and effectively stored such that it may be retrieved on demand. FIG. 9 shows an example, including application processes 901-1 and 901-2 (collectively, application processes 901), times or time ranges 903-1, 903-2, 903-3 and 903-4 (collectively, times or time ranges 903), users or sources 905-1, 905-2 and 905-3 (collectively, users or sources 905), and transaction collections 907-1, 907-2, 907-3 and 907-4 (collectively, transaction collections 907). It should be appreciated that the particular numbers of the application processes 901, times 903, users/sources 905 and transaction collections 907 may vary. FIG. 9 also illustrates that the transaction information may be stored as or using a compressed JavaScript Object Notation (JSON) format store for each transaction 909. This is only an example, however, and use of the JSON format is not a requirement. At data recovery time, requests may specify one or more application processes (e.g., one or more of application processes 901), one or more ranges of time (e.g., one or more of times 903), one or more specific users or sources (e.g., one or more of users/sources 905), and one or more specific transactions (e.g., one or more of transaction collections 907).

Figure 10:
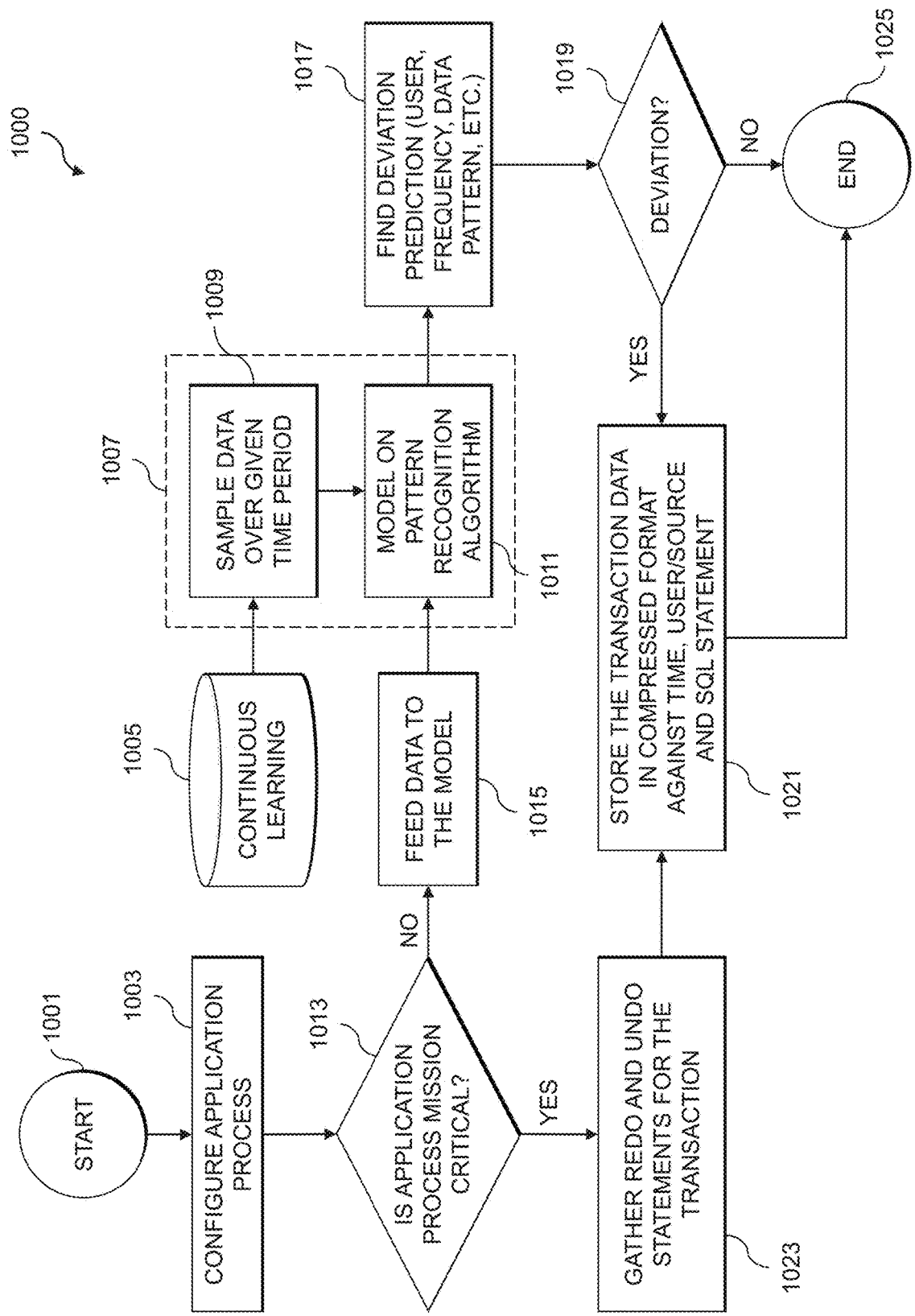
FIG. 10 shows a process for transaction data collection and storage in an intelligent data store in an illustrative embodiment.

FIG. 10 shows a data store process 1000 which may be used in some embodiments. The data store process 1000 starts 1001, and one or more application processes are configured in step 1003 (e.g., applications are registered to use the intelligent transaction restoration system 309). The data store process 1000 further includes continuous learning 1005 (e.g., of transactions in the database system 303). For modelling 1007, data is sampled over a historical time period (e.g., one year) in step 1009, and is used to model the transactions with one or more pattern recognition algorithms in step 1011. The pattern recognition algorithms may include, for example, support vector machine (SVM) or other types of machine learning algorithms.

After the application process is configured in step 1003, transactions continue to be monitored. In step 1013, a determination is made as to whether a particular transaction is for a mission critical application process (e.g., a registered application). If the result of the step 1013 determination is no, the transaction data is fed to the model in 1015. The model is then used to determine whether a pattern of that transaction is found in step 1017. The pattern deviations may be associated with the user/source, frequency, data pattern, etc. as described above with respect to the examples of FIGS. 8A-8D. In step 1019, a determination is made as to whether there is a deviation. If the result of the step 1019 determination is yes, then the transaction data is stored (e.g., in intelligent data store 313) in step 1021. The transaction data may be stored in a compressed format (e.g., a JSON format) against the time, user/source and SQL statements. If the result of the step 1013 determination is yes, statements (e.g., redo, undo, etc.) for the transaction are gathered in step 1023. The transaction data is then stored (e.g., in intelligent data store 313) in step 1021 as previously described. The process 1000 then ends in step 1025 (for that transaction). As more transactions are detected or monitored, the processing may repeat from step 1013. In addition, step 1005 may be performed continuously, such that the model 1007 is continuously refined.

Figure 11:
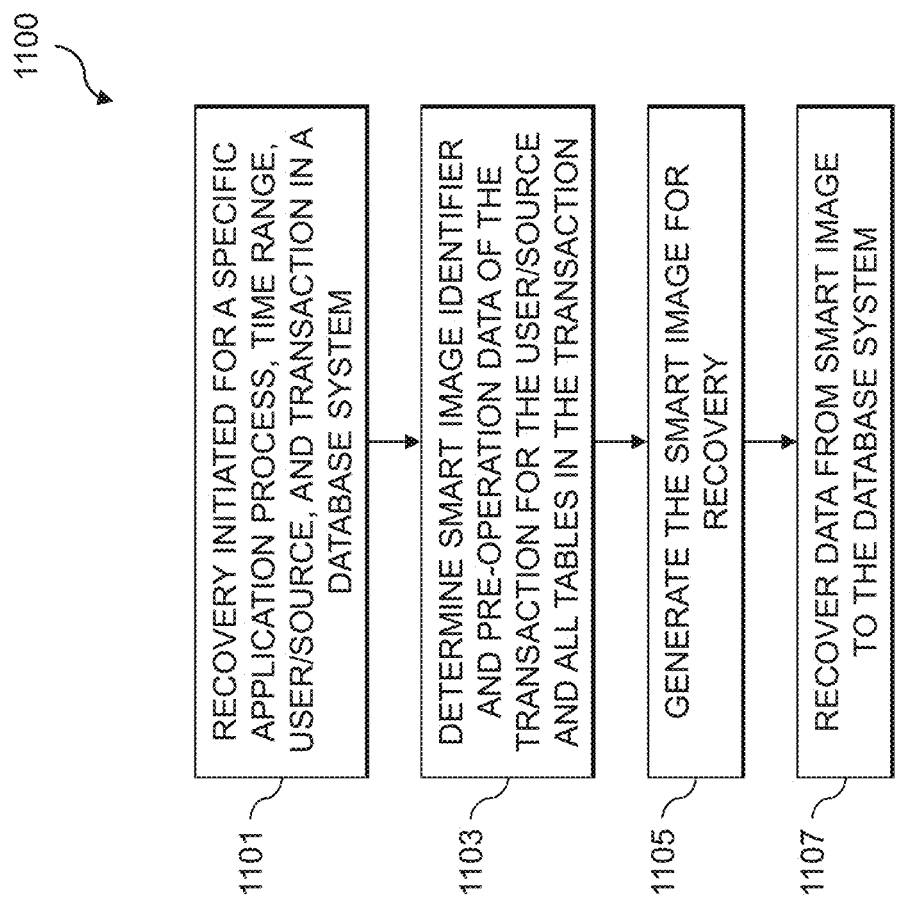
FIG. 11 shows a process for recovery of unsaved transaction data in response to database system failure in an illustrative embodiment.

FIG. 11 shows a data recovery flow 1100 which may be used in some embodiments. The data recovery flow 1100 begins in step 1101 with initiating recovery for a specific application process, time range, user/source and transaction in a database system. In step 1103, a smart image identifier (ID) and pre-operation data of the transaction is determined for the user/source and all tables in the transaction. A smart image for recovery is generated in step 1105, and the data is recovered from the smart image to the database system in step 1107.

Illustrative embodiments advantageously provide methods for capturing and reverse engineering ongoing transactions in database systems, such that in the event of a database crash, failure or other designated event (e.g., such as one resulting from hardware failure), any "lost" transactions (e.g., unsaved data) can be restored in the database systems. Advantageously, the solution may be enabled or disabled for different applications as needed for a particular use case, and different applications may have their own dedicated intelligent transaction restoration systems (e.g., through the use of distinct queues in an intelligent data store thereof, through different intelligent data stores, through distinct intelligent transaction restoration systems altogether, etc.). Further, intelligent data stores in the intelligent transaction restoration system can store the unsaved data in a novel data store type (e.g., in a flash drive) for scalable continuous write and easy read of the data in the event of a crash, failure or other designated event affecting a database system. The intelligent transaction restoration system may run independent of its associated database system (e.g., the intelligent transaction restoration system may be "external" to its associated database system or systems). Further, as noted above, multiple instances of the intelligent transaction restoration system may be run and associated with a single database system (e.g., where different subsets of registered applications utilize different ones of the multiple instances of the intelligent transaction restoration system).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for maintaining ongoing transaction information of a database system in an external data store for processing unsaved transactions in response to designated events will now be described in greater detail with reference to FIGS. 12 and 13. Although described in the context of system 100, these platforms may also be used to implement at least portions of other information processing systems in other embodiments.

Figure 12:
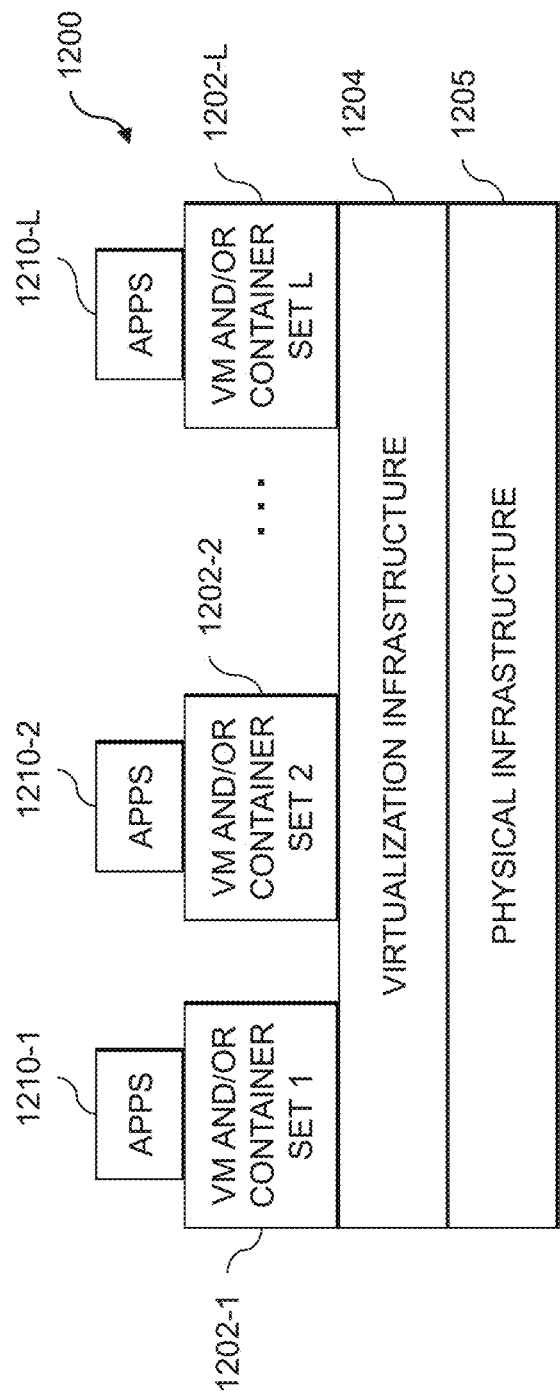
FIGS. 12 and 13 show examples of processing platforms that may be utilized to implement at least a portion of an information processing system in illustrative embodiments.
Figure 13:
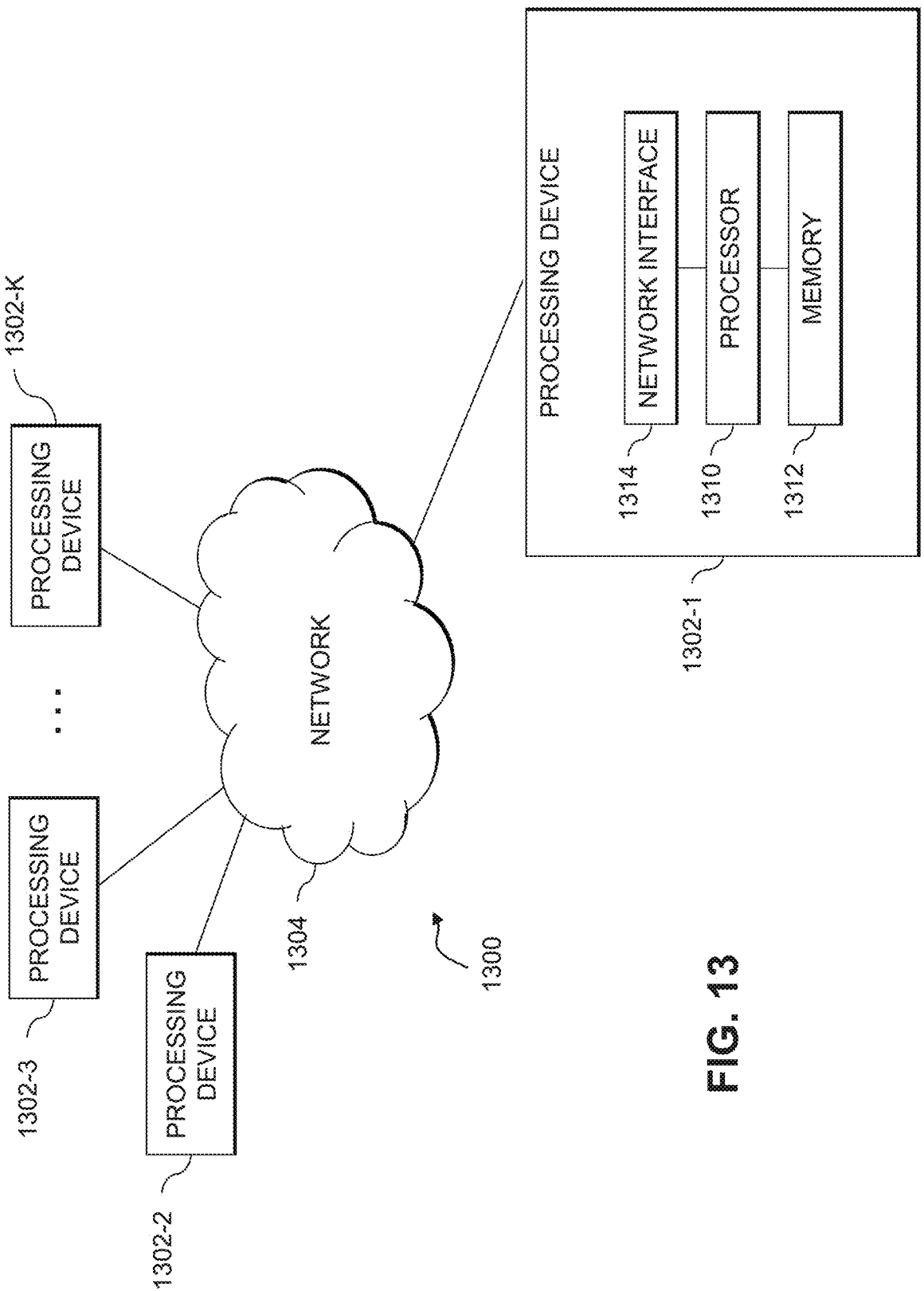

FIG. 12 shows an example processing platform comprising cloud infrastructure 1200. The cloud infrastructure 1200 comprises a combination of physical and virtual processing resources that may be utilized to implement at least a portion of the information processing system 100 in FIG. 1. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for maintaining ongoing transaction information of a database system in an external data store for processing unsaved transactions in response to designated events as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, database systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      monitoring logs of a database system;
      analyzing the logs to collect ongoing transaction information for one or more applications utilizing the database system;
      maintaining the ongoing transaction information for each of the one or more applications in a corresponding one of a set of one or more queues of a data store external to the database system;
      detecting one or more designated events affecting operation of the database system; and
      responsive to detecting at least one of the one or more designated events, processing one or more unsaved transactions of the database system utilizing the ongoing transaction information stored in the set of one or more queues of the data store external to the database system, wherein processing at least one of the one or more unsaved transactions comprises one of (i) committing, in the database system, unsaved transaction data from at least one of the one or more queues and (ii) rolling back, in the database system, the unsaved transaction data from said at least one of the one or more queues;
   wherein maintaining the ongoing transaction information for a given one of the one or more applications in a given corresponding one of the set of one or more queues of the data store external to the database system comprises storing portions of the ongoing transaction information for the given application in the given queue in response to one or more data collection triggering criteria, the one or more data collection triggering criteria being based at least in part on one or more processing patterns derived from analysis of historical transactions of the database system; and
   wherein the one or more data collection triggering criteria are dynamically updated over time based at least in part on processing of at least a subset of the one or more unsaved transactions of the database system utilizing the ongoing transaction information stored in the given queue of the data store external to the database system.

2. The apparatus of claim 1 wherein the at least one processing device is further configured to perform the step of registering the one or more applications.

3. The apparatus of claim 2 wherein registering the given application comprises specifying an application name of the given application, one or more processes of the given application, one or more database objects of the database system to be traced, and one or more transactions for each of the one or more database objects to be traced.

4. The apparatus of claim 3 wherein analyzing the logs to collect the ongoing transaction information for the given application comprises streaming, to the given queue, data associated with the specified one or more transactions.

5. The apparatus of claim 1 wherein analyzing the logs to collect the ongoing transaction information for the given application comprises, for a given transaction, generating a data object for the given transaction specifying an application name of the given application, a given operation, and a current system change number of the database system.

6. The apparatus of claim 5 wherein the data object further comprises at least one of pre-commit data and post-commit data for the given transaction.

7. The apparatus of claim 5 wherein the given queue utilizes a First In, First Out (FIFO) data structure, and wherein maintaining the ongoing transaction information for the given application in the given queue comprises storing the data object in the FIFO data structure.

8. The apparatus of claim 1 wherein each of the set of one or more queues has an associated queue length comprising a number of transactions, and wherein a given queue length of the given queue is defined during registration of the given application.

9. The apparatus of claim 8 wherein data objects for transactions associated with the given application are stored in the given queue in order based on times of the transactions.

10. The apparatus of claim 1 wherein detecting said at least one of the one or more designated events comprises detecting at least one of a hardware failure, a crash and a disaster event affecting the database system.

11. The apparatus of claim 1 wherein processing a given one of the one or more unsaved transactions of the database system utilizing the ongoing transaction information stored in the set of one or more queues of the data store external to the database system comprises determining a type of processing to apply for the given unsaved transaction based at least in part on a comparison of the given unsaved transaction to at least one of the one or more processing patterns derived from the analysis of the historical transactions of the database system.

12. The apparatus of claim 11 wherein determining the type of processing to apply for the given unsaved transaction comprises determining whether to commit the given unsaved transaction to the database system or roll back the given unsaved transaction.

13. The apparatus of claim 11 wherein the one or more processing patterns are derived by analyzing the historical transactions of the database system utilizing one or more machine learning algorithms.

14. The apparatus of claim 1 wherein processing a given one of the one or more unsaved transactions of the database system utilizing the ongoing transaction information stored in the set of one or more queues of the data store external to the database system comprises generating one or more recommendations for a type of processing to apply for the given unsaved transaction, and providing the one or more recommendations to a database administrator of the database system.

15. A computer program product comprising a non-transitory processor-readable storage medium having stored therein program code of one or more software programs, wherein the program code when executed by at least one processing device causes the at least one processing device to perform steps of:
monitoring logs of a database system;
analyzing the logs to collect ongoing transaction information for one or more applications utilizing the database system;
maintaining the ongoing transaction information for each of the one or more applications in a corresponding one of a set of one or more queues of a data store external to the database system;
detecting one or more designated events affecting operation of the database system; and
responsive to detecting at least one of the one or more designated events, processing one or more unsaved transactions of the database system utilizing the ongoing transaction information stored in the set of one or more queues of the data store external to the database system, wherein processing at least one of the one or more unsaved transactions comprises one of (i) committing, in the database system, unsaved transaction data from at least one of the one or more queues and (ii) rolling back, in the database system, the unsaved transaction data from said at least one of the one or more queues;
wherein maintaining the ongoing transaction information for a given one of the one or more applications in a given corresponding one of the set of one or more queues of the data store external to the database system comprises storing portions of the ongoing transaction information for the given application in the given queue in response to one or more data collection triggering criteria, the one or more data collection triggering criteria being based at least in part on one or more processing patterns derived from analysis of historical transactions of the database system; and
wherein the one or more data collection triggering criteria are dynamically updated over time based at least in part on processing of at least a subset of the one or more unsaved transactions of the database system utilizing the ongoing transaction information stored in the given queue of the data store external to the database system.

16. The computer program product of claim 15 wherein:
analyzing the logs to collect the ongoing transaction information for the given application comprises, for a given transaction, generating a data object for the given transaction specifying an application name of the given application, a given operation, and a current system change number of the database system;
the given queue utilizes a First In, First Out (FIFO) data structure; and
maintaining the ongoing transaction information for the given application in the given queue comprises storing the data object in the FIFO data structure.

17. The computer program product of claim 15 wherein processing a given one of the one or more unsaved transactions of the database system utilizing the ongoing transaction information stored in the set of one or more queues of the data store external to the database system comprises determining a type of processing to apply for the given unsaved transaction based at least in part on a comparison of the given unsaved transaction to at least one of the one or more processing patterns derived from the analysis of the historical transactions of the database system.

18. A method comprising:
monitoring logs of a database system;
analyzing the logs to collect ongoing transaction information for one or more applications utilizing the database system;
maintaining the ongoing transaction information for each of the one or more applications in a corresponding one of a set of one or more queues of a data store external to the database system;
detecting one or more designated events affecting operation of the database system; and
responsive to detecting at least one of the one or more designated events, processing one or more unsaved transactions of the database system utilizing the ongoing transaction information stored in the set of one or more queues of the data store external to the database system, wherein processing at least one of the one or more unsaved transactions comprises one of (i) committing, in the database system, unsaved transaction data from at least one of the one or more queues and (ii) rolling back, in the database system, the unsaved transaction data from said at least one of the one or more queues;
wherein maintaining the ongoing transaction information for a given one of the one or more applications in a given corresponding one of the set of one or more queues of the data store external to the database system comprises storing portions of the ongoing transaction information for the given application in the given queue in response to one or more data collection triggering criteria, the one or more data collection triggering criteria being based at least in part on one or more processing patterns derived from analysis of historical transactions of the database system;
wherein the one or more data collection triggering criteria are dynamically updated over time based at least in part on processing of at least a subset of the one or more unsaved transactions of the database system utilizing the ongoing transaction information stored in the given queue of the data store external to the database system; and
wherein the method is performed by at least one processing device comprising a processor coupled to a memory.

19. The method of claim 18 wherein:
analyzing the logs to collect the ongoing transaction information for the given application comprises, for a given transaction, generating a data object for the given transaction specifying an application name of the given application, a given operation, and a current system change number of the database system;
the given queue utilizes a First In, First Out (FIFO) data structure; and
maintaining the ongoing transaction information for the given application in the given queue comprises storing the data object in the FIFO data structure.

20. The method of claim 18 wherein processing a given one of the one or more unsaved transactions of the database system utilizing the ongoing transaction information stored in the set of one or more queues of the data store external to the database system comprises determining a type of processing to apply for the given unsaved transaction based at least in part on a comparison of the given unsaved transaction to at least one of the one or more processing patterns derived from the analysis of the historical transactions of the database system.

* * * * *